Patented Oct. 20, 1953

2,656,253

UNITED STATES PATENT OFFICE 2,656,253

PREPARATION OF CYANAMIDE

Johnstone S. Mackay, Old Greenwich, Conn., assignor to American Cyanamid Company, New York, N. Y., a corporation of Maine No Drawing. Application November 23, 1951,
Serial No. 257,971

4 Claims. (Cl. 23—190)

The present invention relates to the preparation of cyanamide, $H_2NCN$, and more particularly to the preparation of cyanamide from melamine or its deamination products.

It is an object of the invention to heat melamine, melam, melem, or melon, or mixtures thereof, at a temperature sufficiently high to "crack" the triazine molecule into cyanamide vapor. A further object of the invention is to pyrolyze melamine at red heat to form cyanamide, thereafter cooling the cyanamide rapidly to prevent its dimerization or trimerization. Additional objects will be apparent from the discussion hereinafter.

It is well known in the art that cyanamide can be heated to form melamine. It has always been assumed, however, that this transformation was irreversible. For example, if melamine is boiled, at say 500° C., and the resultant vapors chilled, no cyanamide is detectable either in the residue or the sublimate. It has now been discovered that if melamine, melam, melem, or melon, is heated at red heat, e. g. at 610° C. and up, a fair yield of cyanamide is obtained on cooling the vapor effluent.

The following examples illustrate without limiting the invention.

Example 1

The apparatus consists of a piece of heat resistant glass tubing about ½" in diameter and about 20" long, sealed at one end. 10 g. of melamine is placed in the bottom of the tube. The tube is supported at a slight upward tilt from horizontal, and is then ready for heating. The heating is conveniently done by means of four laboratory gas burners. Three burners are placed under the tube to heat the portion of the tube beginning at a point about four inches from the sealed end up to a point about twelve inches from the sealed end, thus providing a hot "cracking" zone about eight inches long. After this portion of the tube becomes red hot, as evidenced by the usual red glow, the fourth burner is applied at the sealed end of the tube, under the melamine. After a few moments, the melamine begins to boil. The melamine vapor together with some extremely fine particles of melamine sublimate pass rapidly through the "cracking" zone, where they are converted in part to free cyanamide. The cyanamide passes on into the cooler part of the tube, where it condenses. Some melamine also condenses with it. After the melamine ceases to boil (indicating formation of stable residue of deamination products), the heat is removed from the tube, and the tube is allowed to cool. The cyanamide can be recovered from the upper part of the tube by various means well known in the art. If it is not essential that the cyanamide be pure, it can simply be scraped from the tube. If a pure product is desired, it can be separated from melamine contamination by leaching the entire solid contents of the tube with ether, followed by evaporation to produce pure crystalline cyanamide.

Example 2

The melamine decomposition product obtained as a residue after boiling away all the melamine used in Example 1 was analyzed and found to consist largely of melam, with smaller amounts of melem and melon. This mixture was placed in another cracking tube similar to that used in Example 1 and heated to a temperature of about 620° C. by means of one laboratory burner. This was the only heat applied to the cracking tube. The mixture was observed to fume. In a region about five inches from the sealed end of the tube, a clear product deposited in a well defined annulus. When the mass of melam, melem, and melon began to char, the heating was discontinued, and the annular condensate was analyzed and found to be substantially pure cyanamide.

Example 3

A quartz tube 24 inches long by 2½ inches inner diameter is heated in a horizontal electric furnace to a temperature of 635° C. The feed end of the tube extends about 8 inches from the furnace. In this end is placed a combustion boat containing 9 g. of melamine. The feed end of the tube is fitted with a port to receive nitrogen gas and a thermometer to measure the temperature over the boat. After the furnace is brought to cracking temperature, the portion of the tube around the boat is heated to about 360° C., while simultaneously passing nitrogen through the system. Nitrogen serves the function of minimizing the decomposition of melamine to its deamination products such as melam. The exit vapors are bubbled slowly into a water scrubbing flask at room temperature to recover cyanamide as an aqueous solution thereof.

The process is not limited to atmospheric pressure, but can be conducted either at sub-atmospheric or super-atmospheric pressures. The temperature can vary widely, but should be substantially over 600° in order to "crack" the triazine molecule. The preferred temperature is about 625–675° C., but higher temperatures, e. g. 700° C., and even higher can be used.

I claim:

1. The method of preparing cyanamide which comprises heating a member of the group consisting of melamine, melam, melem and melon to a temperature of at least 610° C. to form a vapor effluent containing cyanamide, followed by condensing the vapor effluent by cooling sufficiently rapidly to inhibit polymerization of the cyanamide and thereafter recovering the cyanamide.

2. The method according to claim 1 in which melamine vapor is heated at a temperature within in the range 610–700° C.

3. The method according to claim 2 in which the heating is carried out at atmospheric pressure.

4. The method of preparing cyanamide which comprises heating melamine vapor at a temperature of at least 610° C. followed by condensing the resultant vapor mixture of cyanamide and melamine by cooling sufficiently rapidly to inhibit polymerization of the cyanamide and recovering the cyanamide.

JOHNSTONE S. MACKAY.

References Cited in the file of this patent

"Cyanogen Compounds," by H. E. Williams, second ed. (1948), pp. 29, 35; Edward Arnold and Co., London, publishers; first ed. (1915), page 24, J. and A. Churchill Co., London.